United States Patent
Yamashita et al.

(10) Patent No.: US 9,757,882 B2
(45) Date of Patent: *Sep. 12, 2017

(54) METHOD OF PRODUCING OPENED FIBER BUNDLE, AND METHOD OF PRODUCING CLEANING MEMBER, APPARATUS WHICH OPENS FIBER BUNDLE, AND SYSTEM WHICH PRODUCES CLEANING MEMBER

(71) Applicant: Unicharm Corporation, Shikokuchuo-shi, Ehime (JP)

(72) Inventors: Yuji Yamashita, Kanonji (JP); Yasuhiro Koyama, Kanonji (JP)

(73) Assignee: UNICHARM CORPORATION, Ehime (JP)

( * ) Notice: Subject to any disclaimer, the term of this patent is extended or adjusted under 35 U.S.C. 154(b) by 563 days.

This patent is subject to a terminal disclaimer.

(21) Appl. No.: 13/749,719

(22) Filed: Jan. 25, 2013

(65) Prior Publication Data
US 2014/0183780 A1    Jul. 3, 2014

(30) Foreign Application Priority Data
Dec. 29, 2012 (JP) .................................. 2012-289182

(51) Int. Cl.
*D02J 1/18* (2006.01)
*B29C 43/24* (2006.01)
(Continued)

(52) U.S. Cl.
CPC ................ *B29C 43/24* (2013.01); *D02J 1/18* (2013.01); *B29B 15/12* (2013.01); *B29C 70/16* (2013.01);
(Continued)

(58) Field of Classification Search
CPC .... D02J 1/18; D02J 1/22; B29C 43/24; B29C 70/20; B29C 70/202; B29C 70/543;
(Continued)

(56) References Cited

U.S. PATENT DOCUMENTS

| 345,644 A | 7/1886 | Moseman |
|---|---|---|
| 470,898 A | 3/1892 | Reiffel |

(Continued)

FOREIGN PATENT DOCUMENTS

| EP | 0546580 | 6/1993 |
|---|---|---|
| EP | 2009152 | 12/2008 |

(Continued)

OTHER PUBLICATIONS

Office Action mailed Apr. 29, 2015, corresponding to U.S. Appl. No. 13/749,717.

(Continued)

*Primary Examiner* — Seyed Masoud Malekzadeh
(74) *Attorney, Agent, or Firm* — Hauptman Ham, LLP

(57) ABSTRACT

A method of producing an opened fiber bundle is in a space-saving manner. The method of continuously producing an opened fiber bundle for a cleaning member, includes the steps of ($a_1$) providing (i) first nip rolls, (ii) second nip rolls, (iii) third nip rolls, and (iv) an air feeder; ($a_2$) conveying a fiber bundle using the first nip rolls and the second nip rolls to apply a tensile force to the fiber bundle; ($a_3$) conveying the fiber bundle using the second nip rolls and the third nip rolls to relax the fiber bundle, thereby forming a belt-shaped fiber bundle; and ($a_4$) blowing air from the air feeder in a direction intersecting with the conveying direction of the first belt-shaped fiber bundle.

9 Claims, 8 Drawing Sheets

(51) Int. Cl.
| | | |
|---|---|---|
| D02J 1/22 | (2006.01) | |
| D01D 11/02 | (2006.01) | |
| B65H 51/005 | (2006.01) | |
| B29C 70/20 | (2006.01) | |
| B29C 70/16 | (2006.01) | |
| B29B 15/12 | (2006.01) | |
| B29C 70/54 | (2006.01) | |

(52) U.S. Cl.
CPC .......... *B29C 70/20* (2013.01); *B29C 70/202* (2013.01); *B29C 70/543* (2013.01); *B32B 2305/10* (2013.01); *B65H 51/005* (2013.01); *B65H 2701/31* (2013.01); *D01D 11/02* (2013.01); *D02J 1/22* (2013.01)

(58) Field of Classification Search
CPC ...... B29C 70/16; D01D 11/02; B65H 51/005; B65H 2701/31; B32B 2305/10
USPC .................. 264/117; 19/65 R, 66 R; 28/283
See application file for complete search history.

(56) References Cited

U.S. PATENT DOCUMENTS

| | | |
|---|---|---|
| 1,847,065 A | 2/1932 | Munch |
| 1,989,048 A | 1/1935 | Winter et al. |
| 2,733,064 A | 1/1956 | Martin |
| 2,737,688 A | 3/1956 | Jackson |
| 2,738,973 A | 3/1956 | Koch |
| 2,828,752 A | 4/1958 | Jackson |
| 2,836,418 A | 5/1958 | Blattner et al. |
| 2,904,335 A | 9/1959 | Rabinow |
| 2,926,392 A | 3/1960 | Jackson |
| 2,960,023 A | 11/1960 | Greiner et al. |
| 3,017,309 A | 1/1962 | Crawford |
| 3,022,999 A | 2/1962 | Mead |
| 3,095,343 A | 6/1963 | Berger |
| 3,362,707 A | 1/1968 | Lauren |
| 3,370,848 A | 2/1968 | Bartlett |
| 3,376,609 A | 4/1968 | Kalwaites |
| 3,417,560 A | 12/1968 | Watson |
| 3,566,451 A | 3/1971 | Welgand |
| 3,592,371 A | 7/1971 | Wyatt et al. |
| 3,608,024 A | 9/1971 | Yazawa et al. |
| 3,724,037 A | 4/1973 | Nicholson et al. |
| 3,737,950 A * | 6/1973 | Bolliand ............... D02J 1/18 28/220 |
| 3,827,113 A | 8/1974 | Vidal et al. |
| 3,840,941 A | 10/1974 | Neveu |
| 3,860,127 A | 1/1975 | Fassman |
| 3,907,128 A | 9/1975 | Cathers |
| 3,912,258 A | 10/1975 | Martin |
| 3,996,196 A | 12/1976 | Simeth |
| 4,075,375 A | 2/1978 | Komatsu |
| 4,190,241 A | 2/1980 | Krueger |
| 4,319,744 A | 3/1982 | Nagel et al. |
| 4,385,757 A | 5/1983 | Muller |
| 4,514,128 A | 4/1985 | Hedrick |
| 4,640,161 A | 2/1987 | Kurk |
| 4,664,368 A | 5/1987 | Bouwens et al. |
| 4,817,483 A | 4/1989 | Armbruster |
| 4,961,805 A | 10/1990 | Siebert |
| 5,060,351 A * | 10/1991 | Street ..................... D02J 1/18 19/66 T |
| 5,060,929 A | 10/1991 | Kohlmann |
| 5,168,786 A | 12/1992 | Huggins et al. |
| 5,230,764 A | 7/1993 | Moll |
| 5,241,731 A | 9/1993 | Stuart |
| 5,243,890 A | 9/1993 | Ober |
| 5,253,762 A | 10/1993 | Duncan |
| 5,332,210 A | 7/1994 | Silverberg et al. |
| 5,355,567 A | 10/1994 | Holliday |
| 5,417,912 A | 5/1995 | Merry |
| 5,431,530 A | 7/1995 | Kobayashi et al. |
| 5,435,541 A | 7/1995 | Fornay et al. |
| 5,516,091 A | 5/1996 | Nakayama |
| 5,535,576 A | 7/1996 | Walintschek |
| 5,779,432 A | 7/1998 | Pena |
| 6,286,403 B1 | 9/2001 | Rosenthal et al. |
| 6,491,492 B1 | 12/2002 | Cook |
| 6,494,450 B2 | 12/2002 | Tsurumaki |
| 6,554,937 B1 | 4/2003 | Kenmochi et al. |
| 6,572,101 B2 | 6/2003 | Kaya et al. |
| 6,585,842 B1 | 7/2003 | Bompard et al. |
| 6,743,392 B2 | 6/2004 | Tanaka et al. |
| 6,780,264 B2 | 8/2004 | Nakata et al. |
| 7,003,856 B2 | 2/2006 | Hayashi et al. |
| 7,156,011 B2 | 1/2007 | Morris et al. |
| 7,228,587 B2 | 6/2007 | Tanaka et al. |
| 7,300,053 B2 | 11/2007 | Asano |
| 7,339,675 B2 | 3/2008 | Nishida et al. |
| 7,536,761 B2 | 5/2009 | Nestler et al. |
| 7,571,524 B2 | 8/2009 | Kawabe et al. |
| 8,100,038 B2 | 1/2012 | Sandahl |
| 8,201,429 B1 | 6/2012 | Matsunaga |
| 8,357,415 B2 | 1/2013 | Furusawa |
| 8,448,335 B2 | 5/2013 | Lundgren et al. |
| 2002/0026699 A1 | 3/2002 | Hayashi et al. |
| 2002/0148061 A1 | 10/2002 | Tanaka et al. |
| 2003/0000934 A1 | 1/2003 | Tanaka et al. |
| 2003/0127177 A1 | 7/2003 | Lane |
| 2003/0172506 A1 | 9/2003 | Guirman et al. |
| 2004/0149095 A1 | 8/2004 | Miyatake et al. |
| 2005/0005381 A1 | 1/2005 | Tanaka et al. |
| 2005/0039285 A1 | 2/2005 | Tanaka et al. |
| 2005/0066496 A1 | 3/2005 | Ames et al. |
| 2005/0097695 A1 | 5/2005 | Tanaka et al. |
| 2005/0097696 A1 | 5/2005 | Tanaka et al. |
| 2005/0132521 A1 | 6/2005 | Tanaka et al. |
| 2005/0139513 A1 | 6/2005 | Miller |
| 2005/0177967 A1 | 8/2005 | Tanaka et al. |
| 2005/0188490 A1 | 9/2005 | Tanaka et al. |
| 2005/0193514 A1 | 9/2005 | Tanaka et al. |
| 2005/0198760 A1 | 9/2005 | Tanaka et al. |
| 2005/0258589 A1 | 11/2005 | Michler et al. |
| 2006/0005675 A1 | 1/2006 | Scheffer et al. |
| 2006/0016035 A1 | 1/2006 | Tanaka et al. |
| 2006/0016036 A1 | 1/2006 | Tanaka et al. |
| 2006/0048325 A1 | 3/2006 | Tsuchiya |
| 2006/0051434 A1 | 3/2006 | Tsuchiya |
| 2006/0101601 A1 | 5/2006 | Fujiwara et al. |
| 2006/0156876 A1 | 7/2006 | Sussmeier et al. |
| 2006/0179989 A1 | 8/2006 | James et al. |
| 2007/0068353 A1 | 3/2007 | Piucci et al. |
| 2007/0101564 A1 | 5/2007 | Nestler et al. |
| 2008/0047087 A1 | 2/2008 | Levy et al. |
| 2009/0049633 A1 | 2/2009 | Takabayashi et al. |
| 2009/0165230 A1 | 7/2009 | Tsuchiya et al. |
| 2009/0172904 A1 | 7/2009 | Tsuchiya et al. |
| 2009/0196538 A1 | 8/2009 | Liou et al. |
| 2009/0255078 A1 | 10/2009 | Wada et al. |
| 2010/0000382 A1 | 1/2010 | Maddalon |
| 2010/0015383 A1 | 1/2010 | Yamada |
| 2010/0022978 A1 | 1/2010 | Kasai et al. |
| 2010/0058907 A1 | 3/2010 | Kern |
| 2010/0122613 A1 | 5/2010 | Sandahl |
| 2010/0154156 A1 | 6/2010 | Takabayashi et al. |
| 2010/0180745 A1 | 7/2010 | Hall |
| 2011/0088189 A1 | 4/2011 | Wada et al. |
| 2011/0138942 A1 | 6/2011 | Murata |
| 2011/0296965 A1 | 12/2011 | Manek-Honninger et al. |
| 2012/0102678 A1 | 5/2012 | Junker et al. |
| 2012/0132046 A1 | 5/2012 | Supe-Dienes |
| 2012/0135227 A1 | 5/2012 | Kawabe |
| 2012/0167736 A1 | 7/2012 | Yokoe |
| 2014/0182429 A1 | 7/2014 | Saito et al. |
| 2014/0187406 A1 | 7/2014 | Matsumoto et al. |

FOREIGN PATENT DOCUMENTS

| | | |
|---|---|---|
| JP | 4535382 B | 11/1970 |
| JP | 4889917 U | 10/1973 |
| JP | 53-45414 | 4/1978 |

(56) References Cited

FOREIGN PATENT DOCUMENTS

| | | |
|---|---|---|
| JP | 56-169873 | 12/1981 |
| JP | 61-105364 U | 7/1986 |
| JP | 333222 A | 2/1991 |
| JP | 4-289100 A | 10/1992 |
| JP | 5-20896 U | 3/1993 |
| JP | 5245090 A | 9/1993 |
| JP | 5-279950 | 10/1993 |
| JP | 5-316909 | 12/1993 |
| JP | 6-297386 A | 10/1994 |
| JP | 8-49126 | 2/1996 |
| JP | 8-259274 | 10/1996 |
| JP | 9-111644 A | 4/1997 |
| JP | 10110346 A | 4/1998 |
| JP | 10-266012 A | 10/1998 |
| JP | 11323718 A | 11/1999 |
| JP | 2000296083 A | 10/2000 |
| JP | 2001-246595 | 9/2001 |
| JP | 2001-288639 | 10/2001 |
| JP | 2002-66991 A | 3/2002 |
| JP | 2002069781 A | 3/2002 |
| JP | 2003265390 A | 9/2003 |
| JP | 2003268663 A | 9/2003 |
| JP | 2003-293236 A | 10/2003 |
| JP | 2004-238615 A | 8/2004 |
| JP | 2004223692 A | 8/2004 |
| JP | 2005040641 A | 2/2005 |
| JP | 2005046645 A | 2/2005 |
| JP | 2005095665 A | 4/2005 |
| JP | 2005111284 A | 4/2005 |
| JP | 2005137929 A | 6/2005 |
| JP | 2005137930 A | 6/2005 |
| JP | 2005137931 A | 6/2005 |
| JP | 2005144198 A | 6/2005 |
| JP | 2005169148 A | 6/2005 |
| JP | 2005199077 A | 7/2005 |
| JP | 2005230573 A | 9/2005 |
| JP | 2005237975 A | 9/2005 |
| JP | 2006015164 A | 1/2006 |
| JP | 2006034990 A | 2/2006 |
| JP | 2006-152485 | 6/2006 |
| JP | 2006-166931 | 6/2006 |
| JP | 2006141483 A | 6/2006 |
| JP | 2006152485 A | 6/2006 |
| JP | 2006-265762 A | 10/2006 |
| JP | 2007002390 A | 1/2007 |
| JP | 2007029135 A | 2/2007 |
| JP | 2007029136 A | 2/2007 |
| JP | 2007-126810 A | 5/2007 |
| JP | 2007111297 A | 5/2007 |
| JP | 2007135666 A | 6/2007 |
| JP | 2007135774 A | 6/2007 |
| JP | 2007136156 A | 6/2007 |
| JP | 2007159612 A | 6/2007 |
| JP | 2007209460 A | 8/2007 |
| JP | 2007209461 A | 8/2007 |
| JP | 2007236690 A | 9/2007 |
| JP | 2007-283086 | 11/2007 |
| JP | 2008006260 A | 1/2008 |
| JP | 2008119171 A | 5/2008 |
| JP | 2008-125603 A | 6/2008 |
| JP | 2009-153914 | 7/2009 |
| JP | 2009-254536 A | 11/2009 |
| JP | 2010-24575 | 2/2010 |
| JP | 2011-062802 A | 3/2011 |
| JP | 4675218 B2 | 4/2011 |
| JP | 2011084313 A | 4/2011 |
| JP | 2011-94701 A | 5/2011 |
| JP | 4738311 B2 | 8/2011 |
| JP | 4878988 B2 | 2/2012 |
| JP | 2012-115783 A | 5/2012 |
| KR | 20110137660 | 12/2011 |
| WO | 2007/023965 | 3/2007 |
| WO | 2008/099733 A1 | 8/2008 |

OTHER PUBLICATIONS

Office Action mailed Apr. 27, 2015, corresponding to U.S. Appl. No. 13/749,726.
International Search Report Mailed Mar. 25, 2014, corresponds to International Application No. PCT/JP2013/085172.
International Search Report Mailed Mar. 18, 2014, corresponds to International Application No. PCT/JP2013/085177.
International Search Report Mailed Apr. 1, 2014, corresponds to International Application No. PCT/JP2013/085233.
International Search Report and Written Opinion Mailed Feb. 18, 2014, corresponds to International Application No. PCT/JP2013/085203.
International Search Report and Written Opinion Mailed Mar. 25, 2014, corresponds to International Application No. PCT/JP2013/085170.
International Search Report and Written Opinion mailed Feb. 18, 2014, corresponds to Internation Application No. PCT/JP2013/085179.
Office Action mailed Jan. 15, 2015, corresponding to U.S. Appl. No. 13/749,721.

* cited by examiner

METHOD OF PRODUCING OPENED FIBER BUNDLE, AND METHOD OF PRODUCING CLEANING MEMBER, APPARATUS WHICH OPENS FIBER BUNDLE, AND SYSTEM WHICH PRODUCES CLEANING MEMBER

RELATED APPLICATIONS

The present application is based on, and claims priority from, Japanese Application Number 2012-289182, filed Dec. 29, 2012, the disclosure of which is hereby incorporated by reference herein in its entirety.

TECHNICAL FIELD

The present disclosure relates to a method of producing an opened fiber bundle, a method of producing a cleaning member, an apparatus which opens a fiber bundle, and a system which produces a cleaning member.

BACKGROUND ART

Various methods for opening a fiber bundle, particularly a bundle of crimped fibers for use in a brush part or the like of a cleaning member have been being considered.

For example, PTL 1 describes a method of opening continuous filaments, the method including transporting crimped tow by means of a plurality of rolls; and applying a resistance on at least one side of the tow by slidingly contacting at least one sliding body onto the tow at between rolls, whereby continuous filaments stacked in a thickness direction of the tow are caused to sift in a transporting direction of the tow to open the tow and to spread the continuous filaments in a width direction of the tow.

CITATIONS LIST

Patent Literature

PTL 1 Japanese Unexamined Patent Publication No. 2002-069781

SUMMARY OF INVENTION

Technical Problem

The method described in PTL 1 requires a plurality of sliding plates, which results in a larger opening apparatus, and thus it is difficult to miniaturize the apparatus for producing a cleaning member.

Thus it is an object of the present disclosure to provide a method of producing an opened fiber bundle in a more space-saving manner.

Solution to Problem

As a result of assiduous research intended to solve the problems described above, the present inventors have found a method of continuously producing an opened fiber bundle for a cleaning member, comprising the steps of ($a_1$) providing (i) first nip rolls, (ii) second nip rolls, which are disposed downstream from the first nip rolls and have a faster peripheral velocity compared with the first nip rolls, (iii) third nip rolls, which are disposed downstream from the second nip rolls and have a slower peripheral velocity compared with the second nip rolls, and (iv) an air feeder which is disposed downstream from the second nip rolls; ($a_2$) conveying a fiber bundle using the first nip rolls and the second nip rolls to apply a tensile force to the fiber bundle; ($a_3$) conveying the fiber bundle using the second nip rolls and the third nip rolls to relax the fiber bundle, thereby forming a belt-shaped fiber bundle; and ($a_4$) blowing air from the air feeder in a direction intersecting with to the conveying direction of the belt-shaped fiber bundle.

Effects of Invention

The method of producing an opened fiber bundle according to the present disclosure provide an effect of producing an opened fiber bundle in a space-saving manner.

DESCRIPTION OF EMBODIMENTS

The method of producing an opened fiber bundle, the method of producing a cleaning member, the apparatus which opens a fiber bundle, and the system which produces a cleaning member according to the present disclosure will be described in detail.

<<Method of Producing Opened Fiber Bundle and Apparatus which Opens Fiber Bundle>>

The method of continuously producing an opened fiber bundle for a cleaning member according the present disclosure (hereinafter referred to as "method of producing an opened fiber bundle") includes the steps of:

($a_1$) providing (i) first nip rolls, (ii) second nip rolls, which are disposed downstream from the first nip rolls and have a faster peripheral velocity compared with the first nip rolls, (iii) third nip rolls, which are disposed downstream from the second nip rolls and have a slower peripheral velocity compared with the second nip rolls, and (iv) an air feeder which is disposed downstream from the second nip rolls (hereinafter referred to as "step ($a_1$)");

($a_2$) conveying a fiber bundle using the first nip rolls and the second nip rolls to apply a tensile force to the fiber bundle (hereinafter referred to as "step ($a_2$)");

($a_3$) conveying the fiber bundle using the second nip rolls and the third nip rolls to relax the fiber bundle, thereby forming a belt-shaped fiber bundle (hereinafter referred to as "step ($a_3$)"); and ($a_4$) blowing air from the air feeder in a direction intersecting with the conveying direction (machine direction) of the belt-shaped fiber bundle (hereinafter referred to as "step ($a_4$)").

The apparatus which opens a fiber bundle for a cleaning member according to the present disclosure (hereinafter referred to as "apparatus which opens a fiber bundle") includes:

first nip rolls, second nip rolls, which are disposed downstream from the first nip rolls, have a faster peripheral velocity compared with the first nip rolls, and, together with the first nip rolls, convey the fiber bundle to apply a tensile force to the fiber bundle, third nip rolls, which are disposed downstream from the second nip rolls, have a slower peripheral velocity compared with the second nip rolls, and, together with the second nip rolls, convey the fiber bundle to relax the fiber bundle, thereby forming a belt-shaped fiber bundle, and an air feeder which is disposed downstream from the second nip rolls and blows air in a direction intersecting with the conveying direction of the belt-shaped fiber bundle.

The present disclosure will be described along with the method of producing an opened fiber bundle according to the present disclosure and with reference to FIG. 1.

Figure 1:
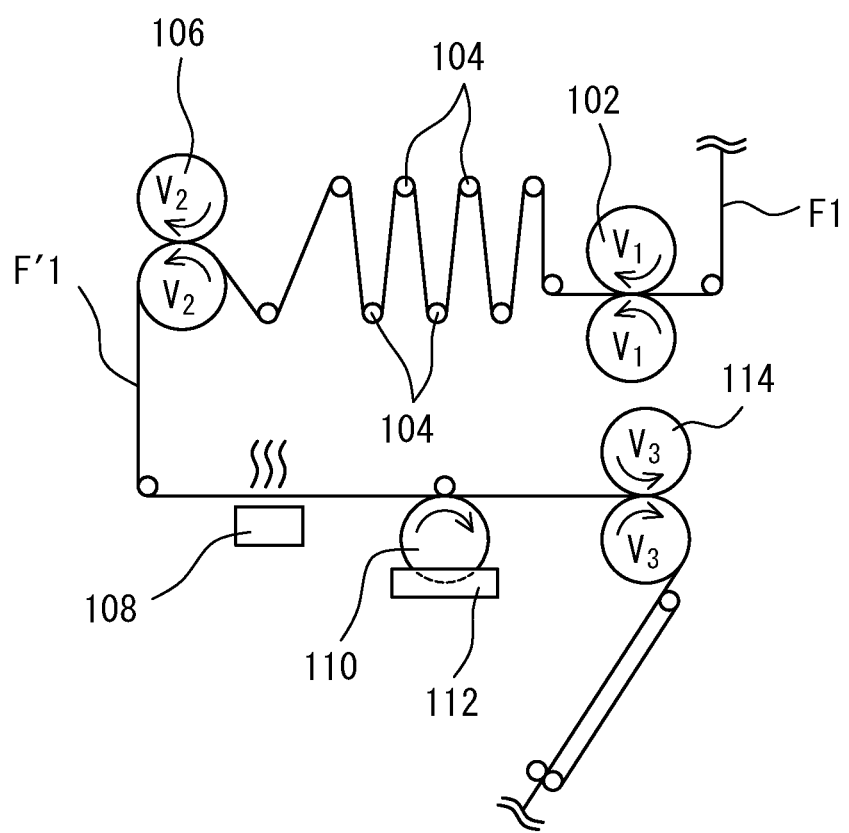
FIG. 1 is a schematic view illustrating a method of producing an opened fiber bundle and/or an apparatus which opens a fiber bundle according to an embodiment of the present disclosure.

FIG. 1 is a schematic view illustrating a method of producing an opened fiber bundle and an apparatus which opens a fiber bundle according to an embodiment of the present disclosure.

[Step ($a_1$)]

FIG. 1 illustrates (i) first nip rolls 102, (ii) second nip rolls 106, which are disposed downstream from the first nip rolls 102 and have a faster peripheral velocity compared with the first nip rolls 102, (iii) third nip rolls 114, which are disposed downstream from the second nip rolls 106 and have a slower peripheral velocity compared with the second nip rolls 106, and (iv) an air feeder 108, which is disposed downstream from the second nip rolls.

[Step ($a_2$)]

As illustrated in FIG. 1, a first fiber bundle F1 is drawn from a container (not illustrated) and conveyed onto the first nip rolls 102. The first nip rolls 102 rotate at a constant peripheral velocity $V_1$ to convey the first fiber bundle F1 in the machine direction MD. The first fiber bundle F1 runs through the first nip rolls 102 and then runs through tension rolls 104 to reach the second nip rolls 106.

The second nip rolls 106 are configured to have the peripheral velocity $V_2$ faster than the peripheral velocity $V_1$ of the first nip rolls 102. Such configuration allows a tensile force in the machine direction to be applied to the first fiber bundle F1 between the first nip rolls 102 and the second nip rolls 106. As a result, the first fiber bundle F1 is extended.

If the first fiber bundle F1 includes crimped fibers, the crimped fibers before the tensile force is applied are approximately uniformly crimped due to its production process, and thus the crimped fibers are less likely to unravel. Application of a tensile force to such fibers allows the crimps of the fibers to be temporarily extended, thereby reducing the crimp degree.

The plurality of tension rolls 104 are preferably formed of, for example, solid steel so that the rolls have a high mass. As substantial force is required to rotate the tension rolls 104, the rate of movement of the first fiber bundle F1 conveyed from the first nip rolls 102 to the second nip rolls 106 can be gradually increased, and thus the tensile force applied to the first fiber bundle F1 can be gradually increased.

The plurality of tension rolls 104 are disposed so that the distance between the first nip rolls 102 and the second nip rolls 106 is increased, in order to gradually increase the tensile force applied to the first fiber bundle F1.

A method of producing an opened fiber bundle and an apparatus which opens a fiber bundle according to another embodiment of the present disclosure do not use the tension rolls.

[Step ($a_3$)]

The first fiber bundle F1 runs through the second nip rolls 106 and then reach the third nip rolls 114 via the air feeder 108 and an oil applicator 110. The third nip rolls 114 are configured to have the peripheral velocity $V_3$ slower than the peripheral velocity V2 of the second nip rolls 106. Thus, after the first fiber bundle F1 runs through the second nip rolls 106, the fibers of the first fiber bundle F1 are opened between the second nip rolls 106 and the third nip rolls 114 because the tensile force is relieved, and the first fiber bundle F1 is further widened, thereby forming a first belt-shaped fiber bundle F'1.

The air feeder 108 will be described in "Step ($a_4$)" described below, while the oil applicator 110 will be described in "Other Steps" described below.

For the method of producing an opened fiber bundle, the method of producing a cleaning member, the apparatus which opens a fiber bundle, and the system which produces a cleaning member, "width direction", as used herein, means a direction which is orthogonal to the machine direction and is horizontal, unless otherwise indicated.

When the first fiber bundle F1 includes crimped fibers, relief of the tensile force allows the crimp of the crimped fibers to be recovered, while the crimps of the adjacent fibers are misaligned, which allows the fiber bundle to be opened.

[Step ($a_4$)]

As illustrated in FIG. 1, the step ($a_4$) is performed by the air feeder 108, which is disposed downstream from the second nip rolls 106 and blows air in a direction intersecting with the machine direction of the belt-shaped fiber bundle F'1.

In an embodiment of the method of producing an opened fiber bundle and the apparatus which opens a fiber bundle according to the present disclosure, the step ($a_4$) is performed after the step ($a_3$) completes. In another embodiment of the method of producing an opened fiber bundle and the apparatus which opens a fiber bundle according to the present disclosure, the step ($a_4$) at least partially overlaps with the step ($a_3$). For example, the step ($a_4$) is performed during the step ($a_3$).

In FIG. 1, the air feeder 108 is disposed between the second nip rolls 106 and the third nip rolls 114, and blows air in a direction intersecting with the machine direction of the first belt-shaped fiber bundle F'1, through its nozzle. The blown air allows the first belt-shaped fiber bundle F'1 to be further widened. Depending on the conditions for blowing air, the fibers located in the middle of the width can be dispersed on the edges of the width, and/or the first belt-shaped fiber bundle F'1 can be further opened.

In another embodiment of the method of producing an opened fiber bundle and the apparatus which opens a fiber bundle according to the present disclosure, the air is blown in the direction of the thickness of the first belt-shaped fiber bundle. In still another embodiment of the method of producing an opened fiber bundle and the apparatus which opens a fiber bundle according to the present disclosure, air is blown in the direction inclined upstream in the machine direction of the fiber bundle.

In another embodiment of the method of producing an opened fiber bundle and the apparatus which opens a fiber bundle according to the present disclosure, air is blown up onto the belt-shaped fiber bundle through the air outlet, which is disposed below, preferably vertically below the belt-shaped fiber bundle. Blowing up air from below the belt-shaped fiber bundle allows the belt-shaped fiber bundle to be floated, and thus the belt-shaped fiber bundle can be further widened.

In another embodiment of the method of producing an opened fiber bundle and the apparatus which opens a fiber bundle according to the present disclosure, the air is blown up onto the belt-shaped fiber bundle through the air outlet which is disposed below the belt-shaped fiber bundle, and a float control plate is disposed above the air outlet so that the belt-shaped fiber bundle is sandwiched between the plate and the air outlet to prevent the belt-shaped fiber bundle from floating.

In another embodiment of the method of producing an opened fiber bundle and the apparatus which opens a fiber bundle according to the present disclosure, an air feeder is disposed downstream from the third nip rolls.

[Other Steps]

An embodiment of the method of producing an opened fiber bundle according to the present disclosure further includes a step of applying dust adsorbent oil to a fiber bundle. The step may be performed after the step $(a_2)$ completes or may at least partially overlap with the step $(a_2)$.

An embodiment of the apparatus which opens a fiber bundle according to the present disclosure includes an oil applicator.

In FIG. 1, the oil applicator 110 and a dust adsorbent oil bath 112 are disposed between the second nip rolls 106 and the third nip rolls 114. Dust adsorbent oil is transferred from the dust adsorbent oil bath 112 to the oil applicator 110, i.e., oil transfer roll, and then the dust adsorbent oil is transferred from the oil transfer roll to the first belt-shaped fiber bundle F'1. The dust adsorbent oil acts to enhance adsorption of dust, dirt, and the like and includes, for example, liquid paraffin and surfactant as major components.

In another embodiment of the method of producing an opened fiber bundle and the apparatus which opens a fiber bundle according to the present disclosure, the oil applicator is disposed at a location other than between the second nip rolls and the third nip rolls such as, a location upstream from the second nip rolls or a location downstream from the third nip rolls.

Still another embodiment of the method of producing an opened fiber bundle and the apparatus which opens a fiber bundle according to the present disclosure does not include the step of applying dust adsorbent oil and/or the oil applicator.

Figure 2:
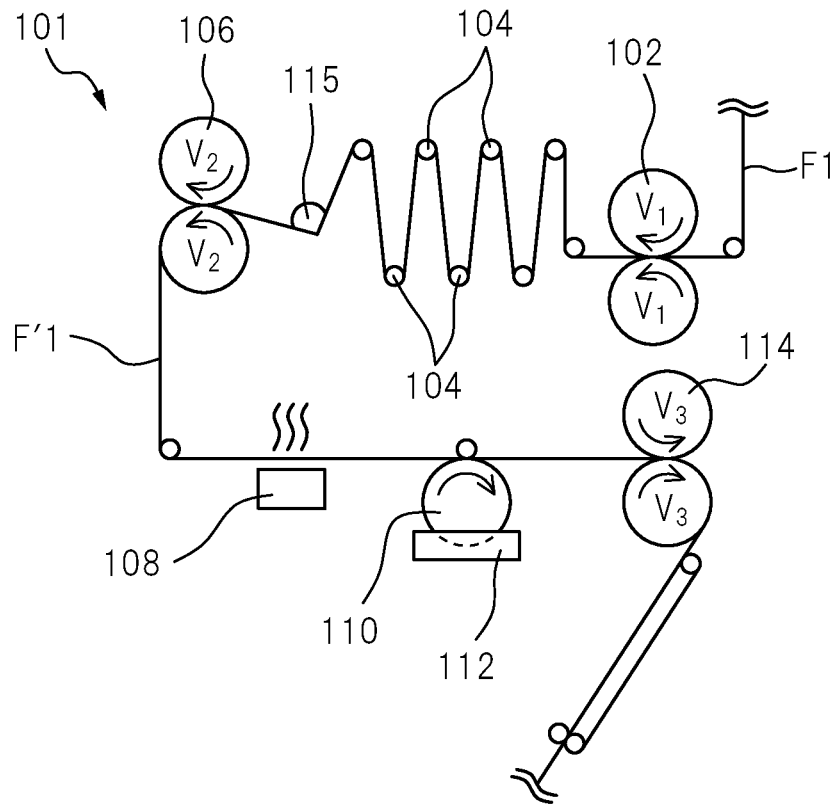
FIG. 2 illustrates a method of producing an opened fiber bundle and/or an apparatus which opens a fiber bundle according to another embodiment of the present disclosure.

FIG. 2 illustrates a method of producing an opened fiber bundle and an apparatus which opens a fiber bundle according to another embodiment of the present disclosure. An apparatus which opens a fiber bundle 101 illustrated in FIG. 2 includes, between first nip rolls 102 and second nip rolls 106, an opening facilitator 115, which includes an edge (not illustrated) extending orthogonal to the machine direction, an upstream portion (not illustrated) adjacently located upstream from the edge, and a downstream portion (not illustrated) adjacently located downstream from the edge, and the apparatus 101 illustrated in FIG. 2 has the same configuration as the apparatus which opens a fiber bundle 101 illustrated in FIG. 1, except that the apparatus illustrated in FIG. 2 conveys a fiber bundle F1 with the fiber bundle pushed onto the upstream portion and the edge of the opening facilitator 115.

Figure 3:
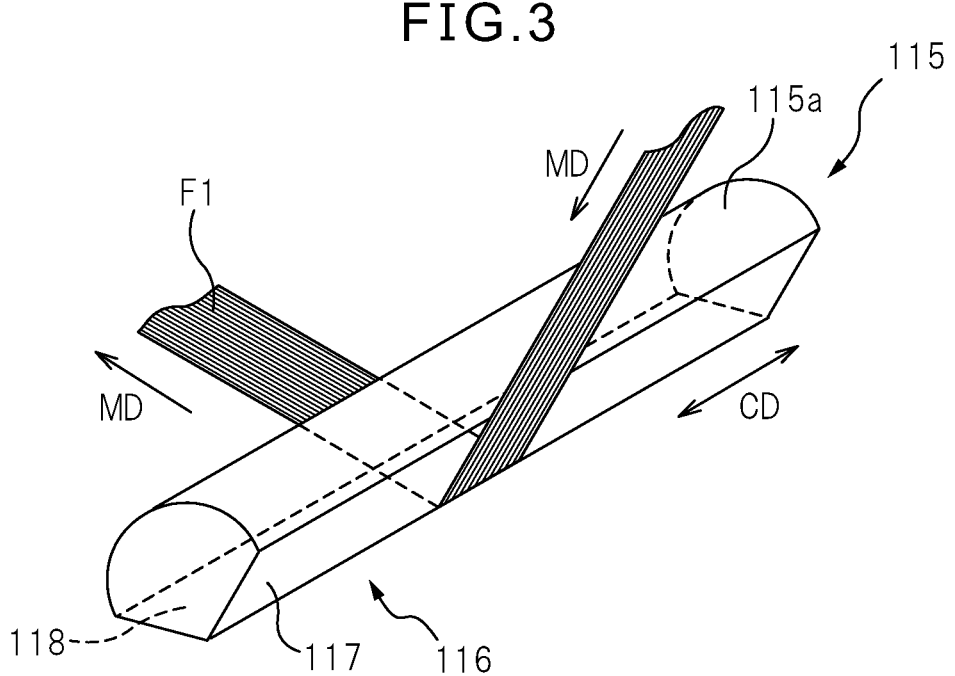
FIG. 3 is an enlarged environmental perspective view of an opening facilitator 115 illustrated in FIG. 2.

FIG. 3 is an enlarged environmental perspective view of the opening facilitator 115 illustrated in FIG. 2. The opening facilitator 115 illustrated in FIG. 3 includes an edge 116 extending in the cross machine direction (CD) orthogonal to the machine direction MD, an upstream portion 117 adjacently located upstream from the edge 116, and a downstream portion 118 adjacently located downstream from the edge.

The fiber bundle F1 is conveyed with the fiber bundle F1 pushed onto the upstream portion 117 and the edge 116 of the opening facilitator 115. Conveying of the fiber bundle F1 with the fiber bundle F1 pushed onto the upstream portion 117 and the edge 116 of the opening facilitator 115 allows the fiber bundle F1 to be widen in the width direction of the fiber bundle F1, thereby causing the machine direction of the fibers which constitute the fiber bundle F1 to be strained in the width direction (in the width direction of the fiber bundle).

Figure 4:
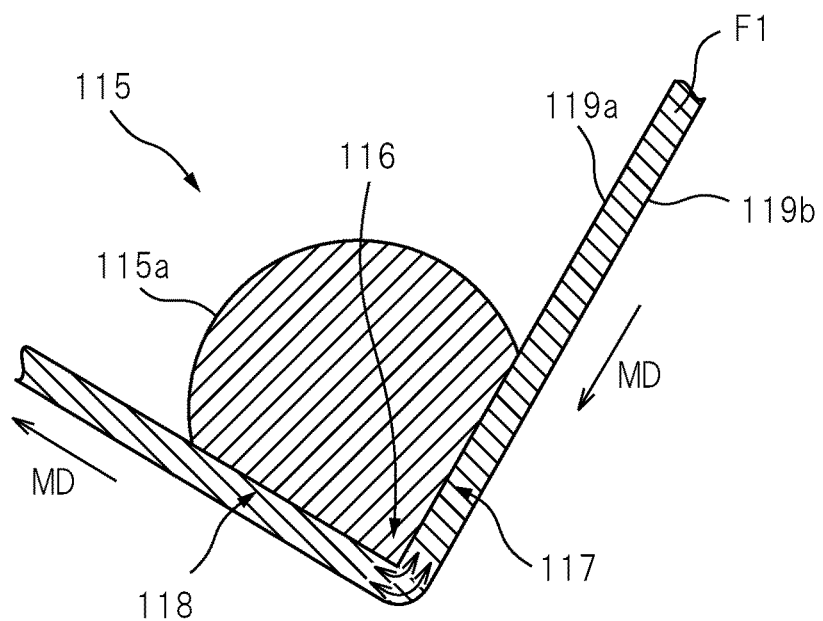
FIG. 4 is an enlarged environmental side view of the opening facilitator 115 illustrated in FIG. 2.

FIG. 4 is an enlarged environmental side view of the opening facilitator 115 illustrated in FIG. 2. The fiber bundle F1 changes its conveying direction (machine direction) to a direction toward a first surface 119a. The first surface 119a is a surface of the fiber bundle F1, the surface contacting with the opening facilitator 115. As a result, the fibers of the fiber bundle F1 which the fibers are located around a second surface 119b opposite to the first surface 119a travel, at the edge 116, over a longer distance compared with the fibers around the first surface 119a. Thus, the fibers which constitute the fiber bundle F1 are strained in the thickness direction (in the thickness direction of the fiber bundle).

As described above, the fibers of the fiber bundle F1 are strained in the directions of both of the thickness and the width on the opening facilitator 115. Thus the fibers are more readily opened, compared with the method described in PTL 1, the method straining fibers only in the direction of the thickness.

In the method of producing an opened fiber bundle and/or the apparatus which opens a fiber bundle according to the present disclosure, the fiber bundle changes its conveying direction, at the edge of the opening facilitator, to a direction toward the first surface preferably by an angle of 30 to 150°, and more preferably by an angle of 60 to 120°. When the angle is less than 30°, the edge has a high curvature, and thus the fibers tend to break, and a failure tends to occur due to entanglement in a roll or the like. On the other hand, when the angle is more than 150°, the ability to facilitate opening tends to be reduced.

In the method of producing an opened fiber bundle and/or the apparatus which opens a fiber bundle according to the present disclosure, the edge of the opening facilitator has preferably an angle of 30 to 150° and more preferably an angle of 60 to 120°, in order to correspond to the change in the conveying direction of the fiber bundle.

Because the opening facilitator 115 includes the upstream portion 117 adjacently located upstream from the edge 116, a large localized force, specifically a large localized force from the edge 116 is less likely to be applied to the fibers which constitute the fiber bundle F1, and thus the fibers are less likely to break.

The opening facilitator 115 illustrated in FIG. 3 and FIG. 4 includes the downstream portion 118 adjacently located downstream from the edge 116. After the fiber bundle F1 runs through the edge 116, the fiber bundle F1 is conveyed along the downstream portion 118. Because the fiber bundle F1 is conveyed along the downstream portion 118, a large localized force, specifically a large localized force from the edge 116 is less likely to be applied to the fibers which constitute the fiber bundle F1, and thus the fibers are less likely to break.

In another embodiment of the method of producing an opened fiber bundle and/or the apparatus which opens a fiber bundle according to the present disclosure, after the fiber bundle runs through the edge, the fiber bundle is conveyed with the fiber bundle pushed onto the downstream portion 118. Conveying of the fiber bundle with the fiber bundle pushed allows the fiber bundle to be more readily opened.

Although the edge 116 of the opening facilitator 115 illustrated in FIG. 3 and FIG. 4 is not rounded, in another embodiment of the method of producing an opened fiber bundle and the apparatus which opens a fiber bundle according to the present disclosure, the opening facilitator includes a rounded edge.

In still another embodiment of the method of producing an opened fiber bundle and the apparatus which opens a fiber bundle according to the present disclosure, the fiber bundle does not run along the downstream portion. In other words, the fiber bundle is conveyed in a direction other than along the downstream portion.

Figure 5:
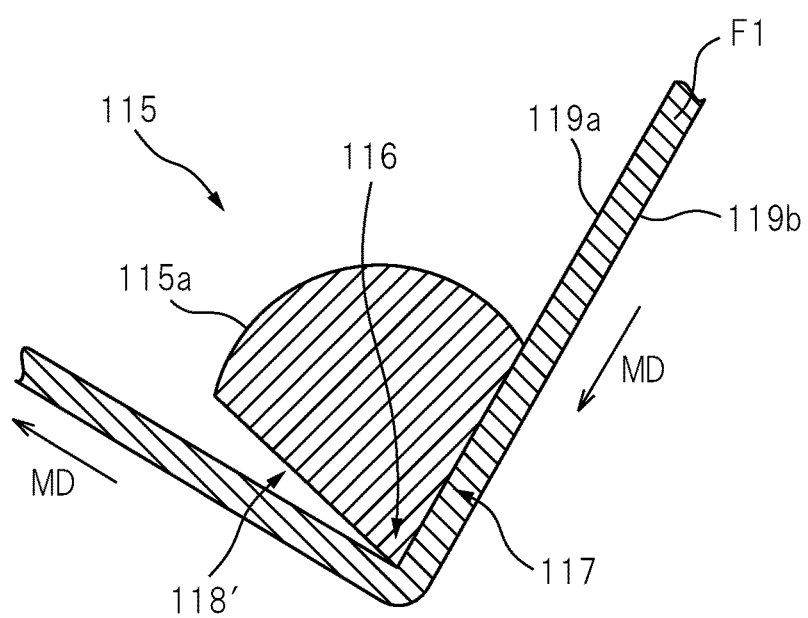
FIG. 5 is a side view of an opening facilitator used in a method of producing an opened fiber bundle and/or an apparatus which opens a fiber bundle according to another embodiment of the present disclosure.

FIG. 5 is a side view of an opening facilitator used in a method of producing an opened fiber bundle and an apparatus which opens a fiber bundle according to another embodiment of the present disclosure, and corresponds to the enlarged environmental side view of the opening facilitator 115 illustrated in FIG. 2. On the opening facilitator 115 illustrated in FIG. 5, the fiber bundle F1 is conveyed in a direction other than along the downstream portion 118' adjacently located downstream from the edge 116.

The upstream portion 117 and the downstream portion 118 of the opening facilitator 115 illustrated in FIG. 3 to FIG. 5 are both a plane surface. In another embodiment of the method of producing an opened fiber bundle and the apparatus which opens a fiber bundle according to the present disclosure, the upstream portion and/or the downstream portion are selected from the group consisting of a plane surface and a convex surface.

The opening facilitator 115 illustrated in FIG. 3 to FIG. 5 includes two plane surfaces (the upstream portion 117 and the downstream portion 118) which meet at the edge 116 in a cross direction (CD) and a curved surface 115a, which is disposed between the plane surfaces and has an approximately fan-shaped machine direction section.

In some other embodiments of the method of producing an opened fiber bundle and the apparatus which opens a fiber bundle according to the present disclosure, the opening facilitator has a polygonal cross direction section such as, a trigonal, tetragonal, pentagonal, or hexagonal cross direction section.

Although the opening facilitator 115 illustrated in FIG. 3 to FIG. 5 is static, in another embodiment of the method of producing an opened fiber bundle and the apparatus which opens a fiber bundle according to the present disclosure, the opening facilitator may be dislocated based on the opening state, while monitoring the opening of the fiber bundle.

Figure 6:
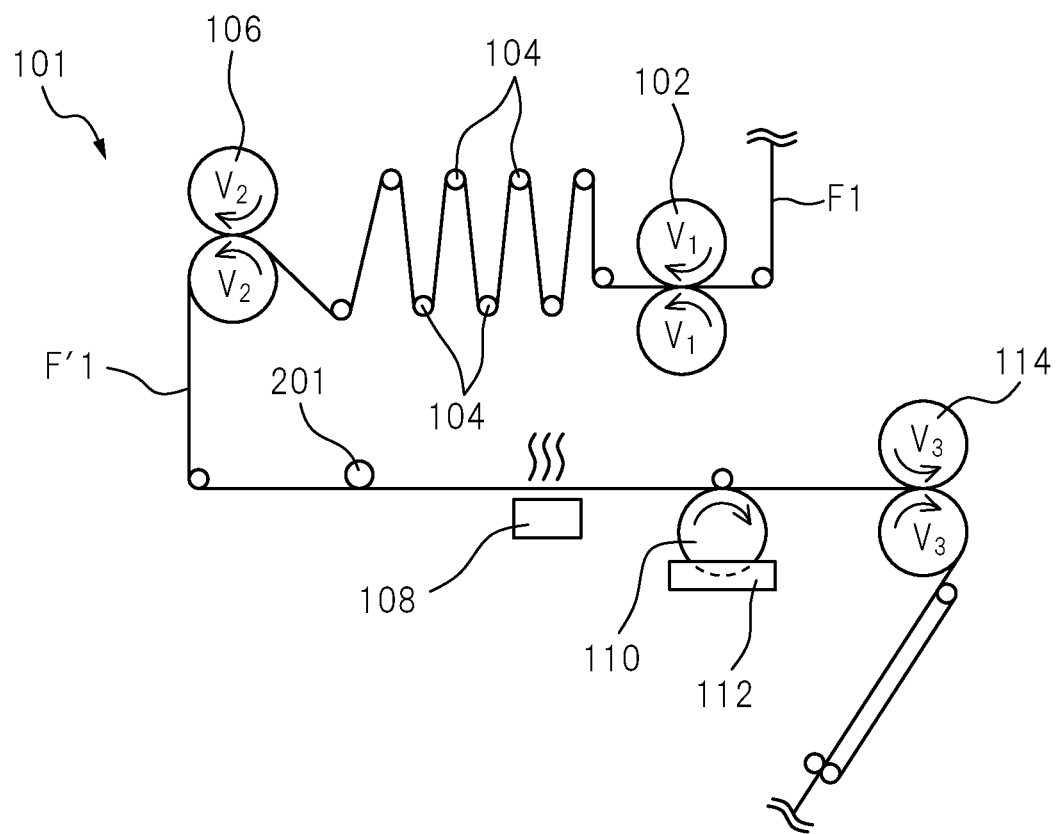
FIG. 6 illustrates a method of producing an opened fiber bundle and/or an apparatus which opens a fiber bundle according to still another embodiment of the present disclosure.

FIG. 6 illustrates a method of producing an opened fiber bundle and an apparatus which opens a fiber bundle according to still another embodiment of the present disclosure. An apparatus which opens a fiber bundle 101 illustrated in FIG. 6 includes, downstream from the second nip rolls 106, more specifically between the second nip rolls 106 and the air feeder 108, a widening member 201, which widens the belt-shaped fiber bundle F'1 in the width direction, and the apparatus illustrated in FIG. 6 has the same configuration as the apparatus which opens a fiber bundle 101 illustrated in FIG. 1, except that the apparatus illustrated in FIG. 6 contacts the belt-shaped fiber bundle with the widening member.

Figure 7:
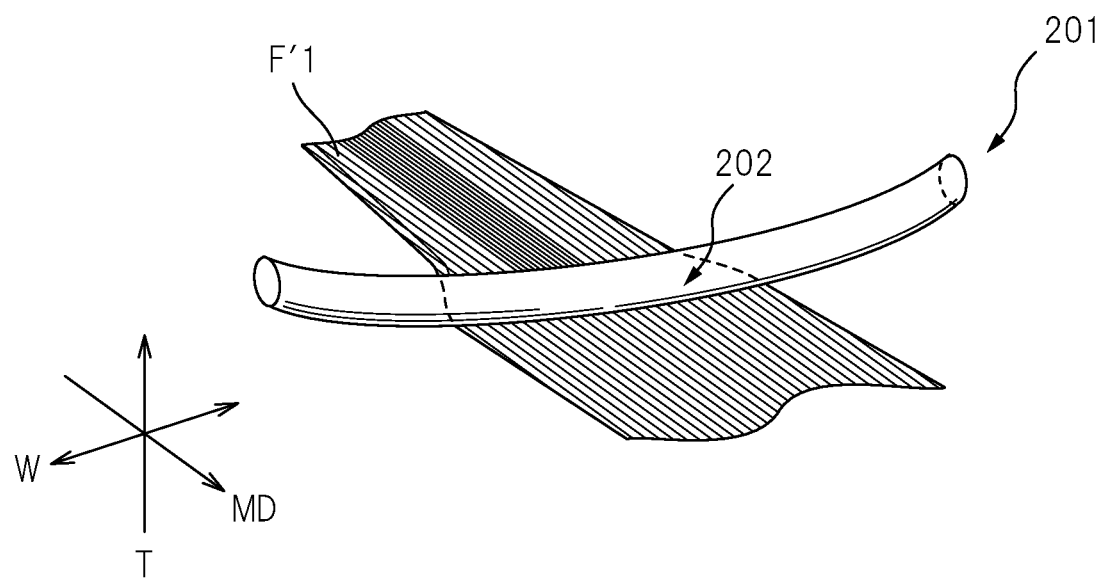
FIG. 7 is a perspective view of a widening member 201 as illustrated in FIG. 6 which the member 201 is widening a belt-shaped fiber bundle F'1 in the width direction.

FIG. 7 is a perspective view of the widening member 201 as illustrated in FIG. 6 which the member 201 is widening a belt-shaped fiber bundle F'1 in the width direction W. The widening member 201 illustrated in FIG. 7 includes a curved portion 202, which is downwardly curved toward the thickness direction T of the belt-shaped fiber bundle F'1, and the belt-shaped fiber bundle F'1 is conveyed while contacting with the curved portion 202. As a result, the fibers contacted with the curved portion 202 are widened in the width direction W, thereby uniforming the basis weight of the belt-shaped fiber bundle F'1.

Especially, the basis weight of the fibers of the belt-shaped fiber bundle F'1 conveyed from the second nip rolls 102 tends to be larger closer to the center of the width. Thus widening of the fibers in the width direction allows the basis weight of the belt-shaped fiber bundle F'1 to be uniformed.

In addition, use of the widening member allows shortening of the operation cycle of the apparatus which opens a fiber bundle.

Although the widening member 201 is disposed between the second nip rolls 106 and the air feeder 108 in FIG. 6, in another embodiment of the method of producing an opened fiber bundle and the apparatus which opens a fiber bundle according to the present disclosure, the widening member is disposed downstream from the second nip rolls, for example, downstream from the air feeder.

Figure 8:
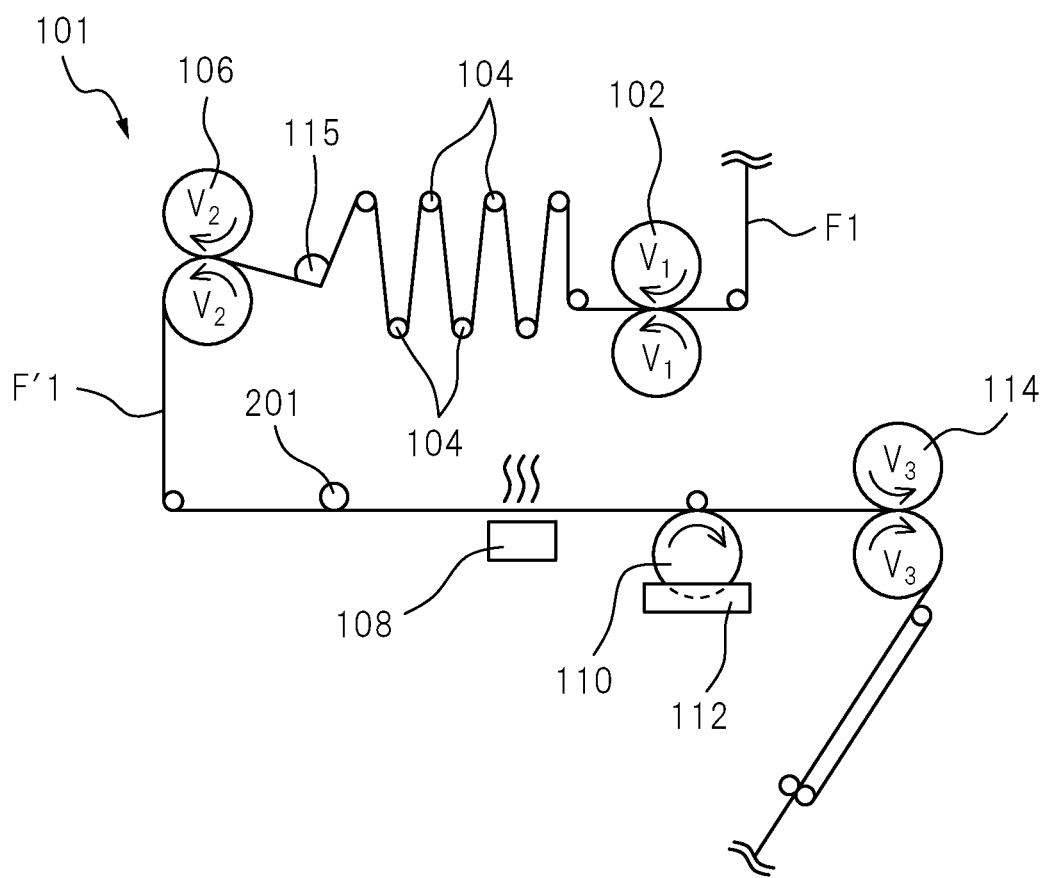
FIG. 8 illustrates a method of producing an opened fiber bundle and/or an apparatus which opens a fiber bundle according to still another embodiment of the present disclosure.

FIG. 8 illustrates a method of producing an opened fiber bundle and an apparatus which opens a fiber bundle according to still another embodiment of the present disclosure. The apparatus which opens a fiber bundle 101 illustrated in FIG. 8 includes, downstream from the second nip rolls 106, more specifically between the second nip rolls 106 and the air feeder 108, the widening member 201, which contacts with the belt-shaped fiber bundle F'1 and widens the belt-shaped fiber bundle F'1 in the width direction W, and the apparatus illustrated in FIG. 8 has the same configuration as the apparatus which opens a fiber bundle 101 illustrated in FIG. 1, except that the apparatus illustrated in FIG. 8 contacts the belt-shaped fiber bundle F'1 with the widening member 201.

<<Method of Producing Cleaning Member and System which Produces Cleaning Member>>

The method of producing a cleaning member according to the present disclosure includes the steps of:

(A) continuously producing an opened fiber bundle (hereinafter referred to as "step (A)"), (B) stacking the opened fiber bundle with one or more other materials to form a multilayer web and fixing the respective materials of the multilayer web to each other (hereinafter referred to as "step (B)"), and (C) cutting the fixed multilayer web into individual cleaning members (hereinafter referred to as "step (C)").

The system which produces a cleaning member according to the present disclosure includes:

an apparatus which opens a fiber bundle, one or more apparatuses which stack the opened fiber bundle with one or more other materials to form a multilayer web and fix the respective materials of the multilayer web to each other, and one or more apparatuses which cut the fixed multilayer web into individual cleaning members.

By way of example, the cleaning member illustrated in FIGS. 10 to 12 will be described and then the present disclosure will be described along with the method of producing a cleaning member and with reference to FIG. 9.

Figure 9:
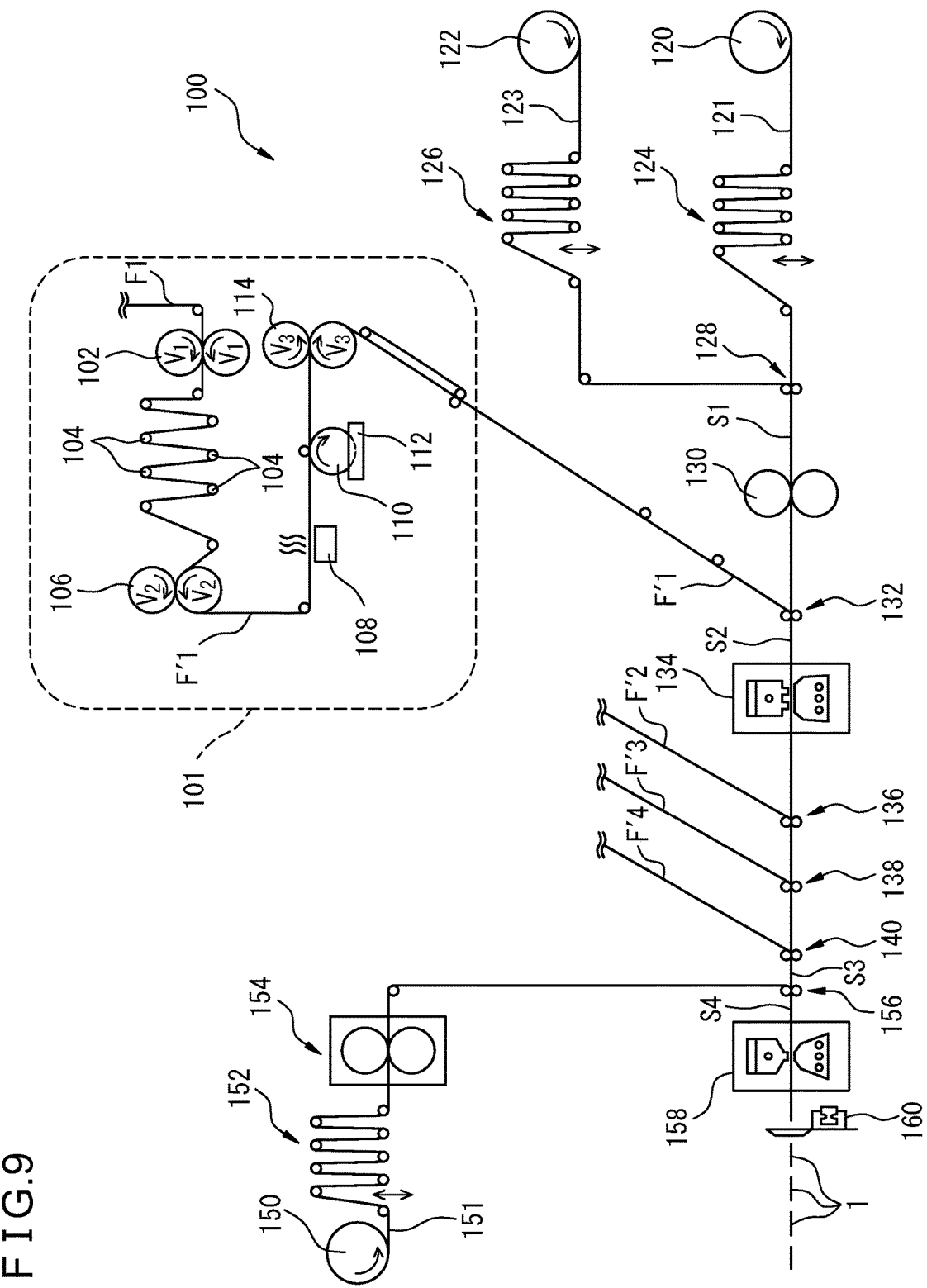
FIG. 9 is a schematic view of an apparatus which opens a fiber bundle and/or a system which produces a cleaning member according to an embodiment of the present disclosure.

FIG. 9 is a schematic view of an apparatus which opens a fiber bundle and a system which produces a cleaning member according to an embodiment of the present disclosure. The method of producing an opened fiber bundle and the method of producing a cleaning member according to the present disclosure can be carried out using the apparatus which opens a fiber bundle and the system which produces a cleaning member illustrated in FIG. 9.

Figure 10:
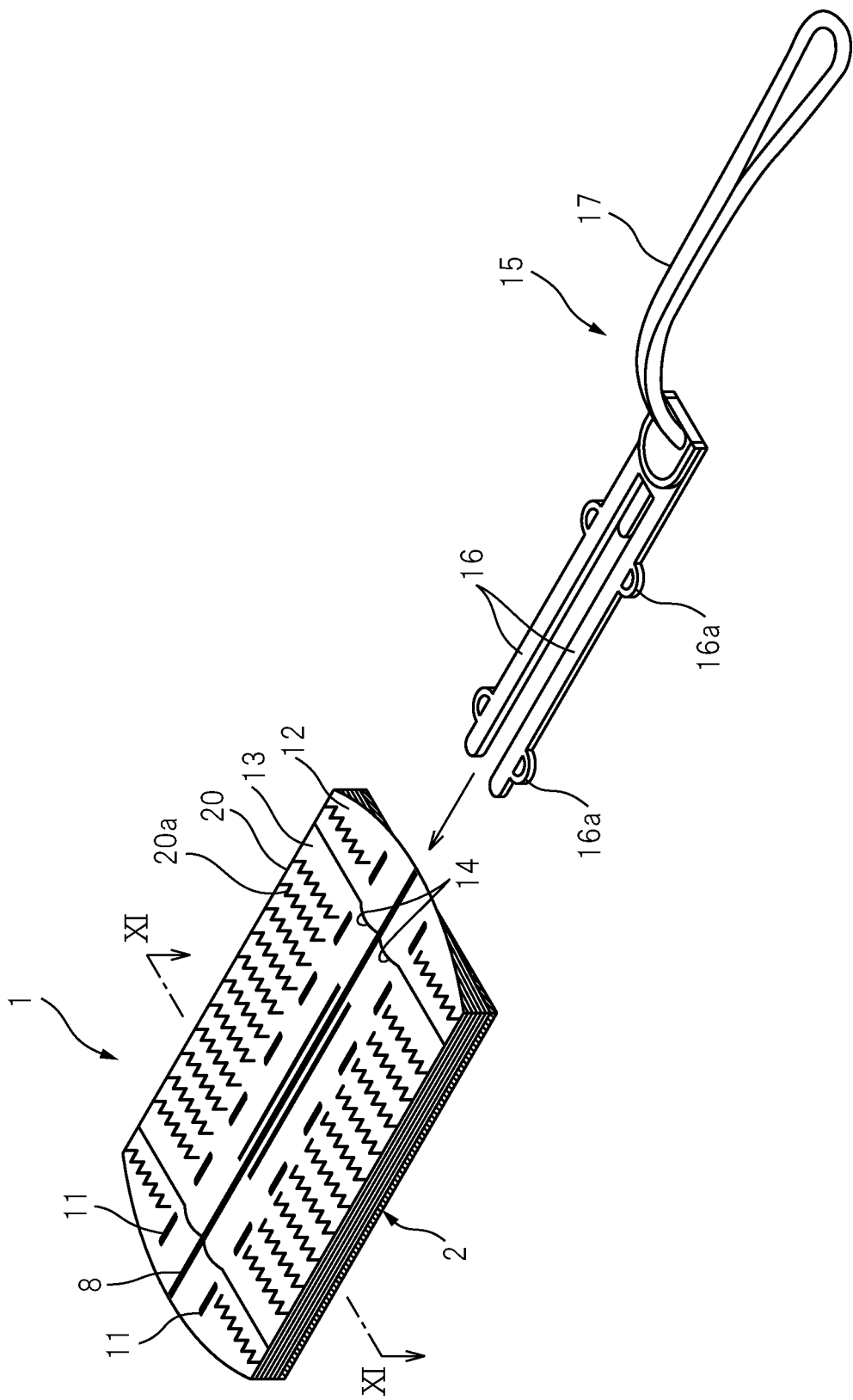
FIG. 10 is an overall perspective view of a cleaning member 1 and a handle 15.
Figure 11:
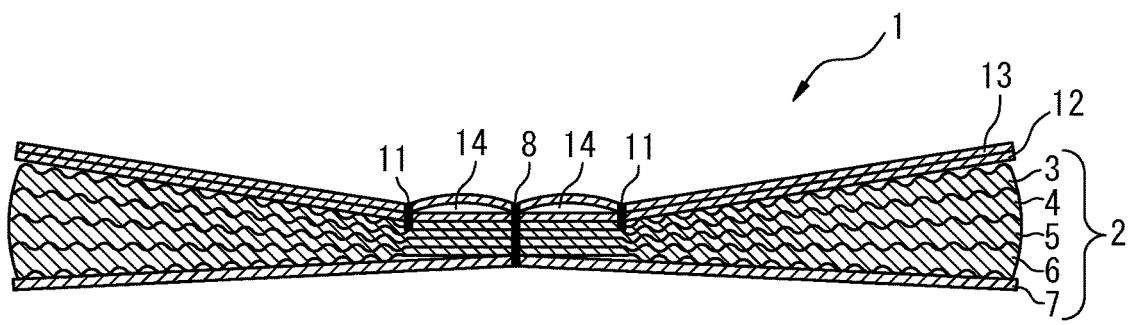
FIG. 11 is a cross sectional view taken along the line XI-XI in FIG. 10.
Figure 12:
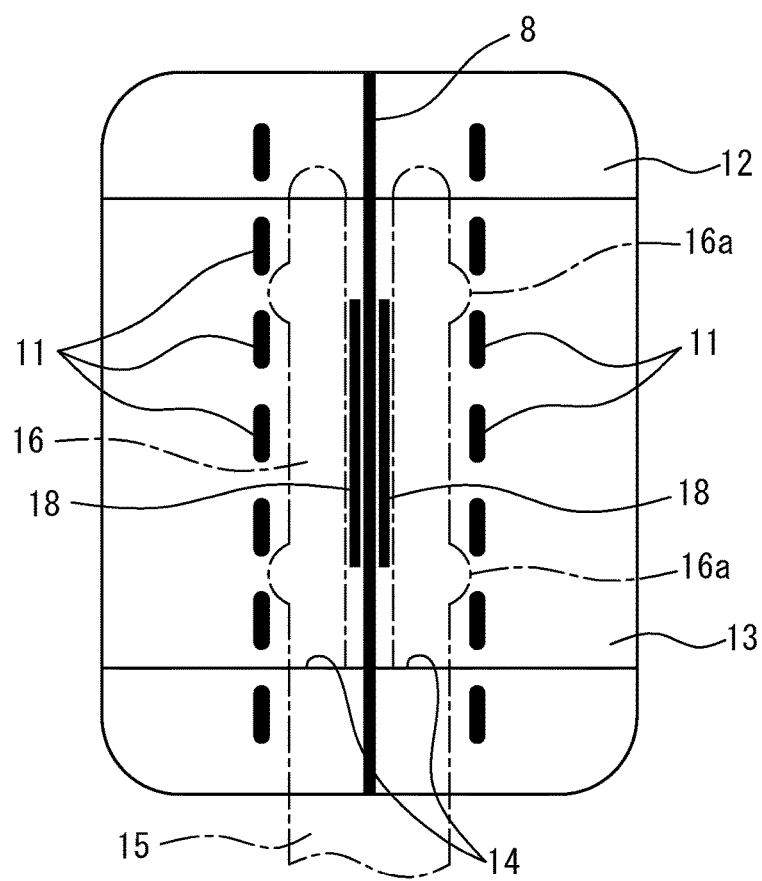
FIG. 12 is a plan view of the cleaning member 1 in FIG. 10.

FIG. 10 to FIG. 12 illustrate a cleaning member 1 produced using the system which produces a cleaning member 100 illustrated in FIG. 9.

FIG. 10 is an overall perspective view of a cleaning member 1 and a handle 15, and FIG. 11 is a cross sectional view taken along the line XI-XI in FIG. 10. And FIG. 12 is a plan view of the cleaning member 1 in FIG. 10.

The cleaning member 1 illustrated in FIG. 10 to FIG. 12 includes a brush part 2 including a first fibrous member 3, a second fibrous member 4, a third fibrous member 5, a fourth fibrous member 6, and a sheet with slits 7 disposed under the fourth fibrous member 6; a substrate sheet 12 stacked on the raised portion 2; and a holding sheet 13 stacked on the substrate sheet 12. And a receiving part 14 is disposed between the substrate sheet 12 and the holding sheet 13, into which an insert part 16 of the handle 15 is inserted.

The upper portion in FIG. 11 is held by the handle, while the lower portion is used for cleaning.

The cleaning member 1 illustrated in FIGS. 10 to 12 includes two receiving parts 14 into which the two-branched insert part 16 of the handle 15 can be inserted. The insert part of the handle, however, may include three or more branches or include no branches. The number of the receiving parts of the cleaning member varies depending on the number of the branches of the insert part of the handle.

As illustrated in FIG. 10, the brush part 2 includes a four-layered fibrous unit which includes the first fibrous member 3, the second fibrous member 4 disposed under the first fibrous member 3, the third fibrous member 5 disposed under the second fibrous member 4, and the fourth fibrous member 6 disposed under the third fibrous member 5; and the sheet with slits 7, which is disposed under the fourth fibrous member 6 of the four-layered fibrous unit. The fibrous unit of the brush part 2 is not limited to the four-layered structure and may include one, two, three, or five or more layers. In another embodiment, the brush part 2 does not include the sheet with slits 7.

Dust adsorbent oil which enhances adsorption of dust, dirt, and the like and which includes, for example, liquid paraffin as a major component is applied to the first, second, third, and fourth fibrous members 3, 4, 5, and 6 of the brush part 2.

The first, second, third, and fourth fibrous member 3, 4, 5, and 6 of the brush part 2 may be formed by cutting an opened fiber bundle such as, an opened tow.

As used herein, "tow" means a bundle of a multiplicity of filaments, as described in JIS L 0204-3: 1998, 3.1.24.

The fiber bundle as described above includes, for example, a fiber bundle which consists of thermoplastic fibers and a fiber bundle which includes thermoplastic fibers.

The fiber materials which constitute the fiber bundle as described above include, for example, polyethylene, polypropylene, polyethylene terephthalate, nylon, rayon, and the like.

The fibers which constitute the fiber bundle as described above include, for example, monofibers and bicomponent fibers such as, sheath-core bicomponent fibers and side-by-side bicomponent fibers.

The bicomponent fibers as described above are preferably sheath-core bicomponent fibers, and more preferably sheath-core bicomponent fibers which have a core melting point higher than a sheath melting point, due to its thermal bondability.

The sheath-core bicomponent fibers as described above are more preferably sheath-core bicomponent fibers which have a core of polypropylene or polyethylene terephthalate and a sheath of polyethylene, and still more preferably sheath-core bicomponent fibers which have a core of polyethylene terephthalate and a sheath of polyethylene.

The fibers which constitute the fiber bundle have preferably a fineness of 1 to 50 dtex, and more preferably a fineness of 2 to 10 dtex. The fiber bundle may include a plurality of different fibers which have a same fineness or may include a single type or a plurality of different fibers which have a different fineness.

The fiber bundle as described above may be a bundle of slit fibers, which are formed by slitting and drawing a film, split fibers, which are formed by splitting an elongated film into network segments, or the like.

In an embodiment of the method of producing a cleaning member and the system which produces a cleaning member according to the present disclosure, the fiber bundle includes or consists of crimped fibers. Because the fiber bundle includes crimped fibers, the fiber bundle can be bulked, and the crimped areas in the brush part formed of the fiber bundle can more easily adsorb dust and dirt.

In another embodiment of the method of producing a cleaning member and the system which produces a cleaning member according to the present disclosure, the fiber bundle does not include crimped fibers.

As described below, the sheet with slits 7 is formed of a nonwoven fabric which consists of or includes thermoplastic fibers (thermally bondable fibers), as with the substrate sheet 12 and the holding sheet 13. And the sheet with slits 7 is formed in a rectangular shape having approximately the same width and length as the substrate sheet 12. The sheet with slits 7 is provided with jagged slits (not illustrated) at predetermined intervals over the entire length of the sheet with slits 7. The slits allow jagged reed-shaped parts (not illustrated) to be formed on both width edges of the cleaning member.

As illustrated in FIG. 10 to FIG. 12, the substrate sheet 12 and the holding sheet 13 are stacked, in this order, on the first fibrous member 3 of the brush part 2, and the receiving part 14 into which the insert part 16 of the handle 15 is inserted is disposed between the substrate sheet 12 and the holding sheet 13.

As illustrated in FIG. 12, the substrate sheet 12 and the holding sheet 13 have the same length in the width direction of the cleaning member, but have a different length in the longitudinal direction of the cleaning member. In other words, the substrate sheet 12 has a longer length in the longitudinal direction of the cleaning member. The holding sheet 13 is stacked on the substrate sheet 12 so that the each longitudinal end of the substrate sheet 12 protrudes outward from the corresponding longitudinal end of the holding sheet 13 by a predetermined distance.

For the cleaning member 1 illustrated in FIG. 10 to FIG. 12, "the longitudinal direction of the cleaning member" (the vertical direction in FIG. 12) means a direction of insertion of the handle 15, while "the width direction of the cleaning member" (the horizontal direction in FIG. 11 and FIG. 12) means a direction orthogonal to the longitudinal direction of the cleaning member.

The substrate sheet 12 and the holding sheet 13 are formed of a nonwoven fabric which consists of or includes thermoplastic fibers (thermally bondable fibers). The thermoplastic fibers include, for example, polyethylene fibers, polypropylene fibers, polyethylene terephthalate fibers, bicomponent fibers of polyethylene and polyethylene terephthalate such as, sheath-core bicomponent fibers which have a core of polyethylene terephthalate and a sheath of polyethylene and bicomponent fibers of polyethylene and polypropylene, and the like. The nonwoven fabric includes a thermal-bonded nonwoven fabric, a spun-bonded nonwoven fabric, a spun-laced nonwoven fabric, and the like.

In another embodiment, the substrate sheet and the holding sheet are formed of a thermoplastic resin film such as, a polyethylene film and a polypropylene film. In still another embodiment, the substrate sheet and the holding sheet are formed of a laminate sheet of a nonwoven fabric and a resin film.

The substrate sheet 12 and the holding sheet 13 are melt bonded to the entire layers of the brush part 2 (the first, second, third, and fourth fibrous members 3, 4, 5, and 6, and the sheet with slits 7) by the first melt bonding apparatus as described below, which is numbered 158 in FIG. 9, and then the first melt bonded part 8 which extends in the longitudinal direction of the cleaning member is formed at the center of the width of the cleaning member, as illustrated in FIG. 10 to FIG. 12.

Additionally, the substrate sheet 12 and the holding sheet 13 are melt bonded to one of the layers of the brush part 2 (the first fibrous member 3), on the opposing sides of the first melt bonded part 8, by the second melt bonding apparatus as described below, which is numbered 134 in FIG. 9, and then two second melt bonded parts 11 are formed in the longitudinal direction. Each of the two second melt bonded parts 11 is formed as a dotted line. Melt bonding of the first fibrous member 3 to the substrate sheet 12 and the holding sheet 13 allows the first fibrous member 3 to be moved with the sheets 12 and 13, thereby facilitating spreading of the brush part 2 in use and thus improving cleaning efficiency.

The substrate sheet 12 and the holding sheet 13 are melt bonded to the entire layers of the brush part 2 (the first, second, third, and fourth fibrous members 3, 4, 5, and 6 and the sheet with slits 7) by the first melt bonded part 8, and the substrate sheet 12 and the holding sheet 13 are also melt bonded to the first fibrous member 3 of the brush part 2 by the two second melt bonded parts 11. This allows a pair of the receiving parts 14 to be formed between the substrate sheets 12 and the holding sheet 13, the receiving parts being defined by the first melt bonded part 8 and one of the two second melt bonded parts 11, extending in the longitudinal direction of the substrate sheet 12 and the holding sheet 13, and being a tube open at opposing longitudinal sides. Thus, the insert part 16 of the handle 15 can be inserted into the receiving parts 14.

The substrate sheet 12 and the holding sheet 13 are melt bonded to the first fibrous member 3 of the brush part 2 along the longitudinal centerline of the cleaning member by the second melt bonding apparatus as described below, which is numbered 134 in FIG. 9, and thus a pair of melt bonded lines 18 are formed at a predetermined width distance from each other. Between the pair of the melt bonded lines 18, the first melt bonded part 8 is formed. The pair of the melt bonded lines 18 are marks which are used to control the position of the first melt bonded part 8 during manufacturing. Good and flawed products are distinguished by determining, using a sensor or the like, whether the first melt bonded part 8 is located between the melt bonded lines 18.

Each of the two second melt bonded parts 11 is disposed as a dotted line in the longitudinal direction. A circular arc projection 16a of the respective insert part 16 of the handle 15 is locked into a non-bonded area in the second melt bonded parts 11 to prevent removal of the respective insert part 16 of the handle 15 from the respective receiving part 14.

As illustrated in FIG. 10, the substrate sheet 12 and the holding sheet 13 are provided with jagged slits 20a. The slits 20a are disposed at predetermined intervals on the opposing width edges of the cleaning member (outwardly of the two second melt bonded parts 11) and in the longitudinal direction of the cleaning member. A plurality of reed-shaped parts 20 with jagged edges are defined in the substrate sheet 12 and the holding sheet 13 by the slits 20a.

In another embodiment, the substrate sheet 12 and the holding sheet 13 include no jagged slits 20a, and thus the cleaning member includes no reed-shaped parts 20.

The handle 15 is formed of plastic or the like, and, as illustrated in FIG. 10, includes a pair of rectangular insert parts 16 disposed parallel to each other; a pair of circular arc projections 16a protruding from the lateral surface of the opposing longitudinal edge portions of the respective insert parts 16, and a holder 17 integrally disposed at one end of the insert parts 16.

The respective insert parts 16 of the handle 15 are inserted into the respective receiving parts 14 of the cleaning member 1, and projections 16a are locked into a non-bonded area in the second melt bonded parts 11 to attach the cleaning member 1 to the handle 15.

A user holds the holder 17 of the handle 15, contacts the brush part 2 with a surface to be cleaned, and moves the cleaning member in a desired direction so that the brush part 2 adsorbs the dust, dirt, and the like on the surface, for cleaning the surface.

The cleaning member illustrated in FIG. 10 to FIG. 12 is an example of the cleaning members which can be produced using the method of producing an opened fiber bundle, the method of producing a cleaning member, the apparatus which opens a fiber bundle, and/or the system which produces a cleaning member according to the present disclosure. The method of producing a cleaning member, and the system which produces a cleaning member according to the present disclosure can be used to produce a cleaning member as described in, for example, Japanese Unexamined Patent Publication No. 2000-296083, 2003-265390, 2003-268663, 2004-223692, 2005-046645, 2005-095665, 2005-111284, 2005-137929, 2005-137930, 2005-137931, 2005-144198, 2005-169148, 2005-199077, 2005-230573, 2005-237975, 2006-015164, 2006-034990, 2006-141483, 2007-135774, 2007-209460, 2007-209461, 2007-029136, 2007-

111297, 2007-135666, 2007-136156, 2007-159612, 2007-236690, 2008-006260, 2008-119171, and 2007-029135, the entire disclosure of which is incorporated herein by reference.

In addition, the method of producing a cleaning member and the system which produces a cleaning member according to the present disclosure can be used to produce a cleaning member as described in, for example, U.S. Pat. No. 6,554,937B, US2002/148061A, US2003/0000934A, US2004/0149095A, US2005/0005381A, US2005/039285A, US2005/097695A, US2005/097696A, US2005/132521A, US2005/177967A, US2005/188490A, US2005/193513A, US2005/193514A, US2005/198760A, US2006/016035A, US2006/016036A, US2006/101601A, US2009/165230A and US2009/172904A, as well as US2009/049633A, US2009/255078A and US2010/154156A, the entire disclosure of which is incorporated herein by reference.

[Step (A)]

The description of the step (A) is omitted. For the details, see "Method of Producing Opened Fiber Bundle and Apparatus which opens Fiber Bundle" described above.

[Step (B)]

In the step (B), the opened fiber bundle is stacked with one or more other materials to form a multilayer web, and the respective materials of the multilayer web are fixed to each other. The one or more other materials which constitute the multilayer web include one or more opened fiber bundles, nonwoven fabrics, and the like. The method of fixing as described above includes use of adhesive such as, hot-melt adhesive, sealing such as, heat sealing and ultrasonic sealing, and the like.

Although the method of producing a cleaning member and the system which produces a cleaning member according to the present disclosure is not intended to include a multilayer web of a particular structure, one of the embodiments will be described with reference to FIG. 9.

In FIG. 9, the first belt-shaped fiber bundle F'1 runs through the third nip rolls 114 and then goes to a merging point 132.

On the other hand, a belt-shaped nonwoven fabric 121, which is to form the substrate sheet 12, is continuously wound off from a nonwoven fabric roll 120. The belt-shaped nonwoven fabric 121 is intermittently conveyed by running the belt-shaped nonwoven fabric 121 through a dancer roller 124, which includes a plurality of rolls arranged in upper and lower rows, the rolls in the lower row oscillating up and down. As used herein, "intermittently conveying" refers to repeating a cycle of conveying materials a certain distance (for example, a length corresponding to the width length of the cleaning member) and then halting conveying for a certain period. Intermittent conveying of materials allows time to be gained for melt bonding the components of the multilayer web as described below.

Similarly, a belt-shaped nonwoven fabric 123, which is to form the holding sheet 13, is continuously wound off from a nonwoven fabric roll 122. The belt-shaped nonwoven fabric 123 is intermittently conveyed by running the belt-shaped nonwoven fabric 123 through a dancer roller 126, which includes a plurality of rolls arranged in upper and lower rows, the rolls in the lower row oscillating up and down.

The belt-shaped nonwoven fabric 123 is stacked onto the belt-shaped nonwoven fabric 121 at merging point 128 to form a multilayer web S1 of the belt-shaped nonwoven fabric 121 and the belt-shaped nonwoven fabric 123. The multilayer web S1 runs through a gather cutter 130, which includes serrated blades (not illustrated) formed at spaced apart locations on its circumferential surface, to make slits into the multilayer web S1. The slits in the multilayer web S1 correspond to the slits 20a in the substrate sheet 12 and the holding sheet 13 illustrated in FIG. 10.

Then the first belt-shaped fiber bundle F'1 is stacked onto the multilayer sheet S1 at the merging point 132 to form a multilayer web S2 of the first belt-shaped fiber bundle F'1 and the multilayer sheet S1.

The zone between the third nip rolls 114 and the merging point 132 is configured to convey the first belt-shaped fiber bundle F'1 with the first belt-shaped fiber bundle F'1 flexed to some extent. The flexing brings the similar result of disposing a dancer roller between the third nip rolls 114 and the merging point 132.

The substrate sheet 12, the holding sheet 13, and the first fiber bundle F1, which constitute the multilayer web S2, are melt bonded by a second melt bonding apparatus 134 to form the two second melt bonded parts 11 (see FIG. 11). For the method of producing a cleaning member and the system which produces a cleaning member according to the present disclosure, the second melt bonding apparatus includes, for example, a heat-sealing apparatus, an ultrasonic sealing apparatus, and the like.

Next, in the same manner for the first fiber bundle F1, an opened second fiber bundle F2 (a second belt-shaped fiber bundle F'2) is stacked onto the multilayer web S2 at a merging point 136, and a third fiber bundle F3 (a third belt-shaped fiber bundle F'3) is stacked onto the resulting web at a merging point 138. Then a fourth fiber bundle F4 (a fourth belt-shaped fiber bundle F'4) is stacked onto the resulting web at a merging point 140 to form a multilayer web S3.

Next, a belt-shaped nonwoven fabric 151, which is to form the sheet with slits 7, is continuously wound off from a nonwoven fabric roll 150. The belt-shaped nonwoven fabric 151 is intermittently conveyed by running the belt-shaped nonwoven fabric 151 through a dancer roller 152, and then runs through a gather roll 154. The gather roll 154 includes serrated blades (not illustrated) continuously formed on its circumferential surface, thereby making jagged slits (not illustrated) into the belt-shaped nonwoven fabric 151 running through the gather roll 154.

The sheet with slits 7 formed of the belt-shaped nonwoven fabric 151 is stacked onto the multilayer web S3 at a merging point 156 to form a multilayer web S4 of the sheet with slits 7 and the multilayer web S3.

Then the multilayer web S4 is melt bonded in the thickness direction using a first melt bonding apparatus 158 to form the first melt bonded part 8 (see FIG. 12 and the like) in the multilayer web S4. For the method of producing a cleaning member and the system which produces a cleaning member according to the present disclosure, the first melt bonding apparatus includes, for example, a heat-bonding apparatus, an ultrasonic sealing apparatus, and the like.

[Step (C)]

As the method of producing a cleaning member and the system which produces a cleaning member according to the present disclosure is not intended to include a multilayer web of a particular structure, the step (C) is not particularly limited, so long as the step can cut the fixed multilayer web into individual cleaning members.

After the multilayer web S4 runs through the first melt bonding apparatus 158, the web S4 is cut by a cutter unit 160 to produce the cleaning member 1.

Although the system which produces a cleaning member 100 illustrated in FIG. 9 includes the gather roll 154, another embodiment of the method of producing a cleaning member and the system which produces a cleaning member according to the present disclosure does not include the gather roll, and the resulting cleaning members include a nonwoven fabric sheet, instead of the sheet with slits.

Still another embodiment of the method of producing a cleaning member and the system which produces a cleaning member according to the present disclosure does not include the gather roll and the step performed upstream from the roll, and the resulting cleaning members include a fibrous member formed as a cleaning surface.

Although the system which produces a cleaning member 100 illustrated in FIG. 9 forms a receiving part below the surface of the cleaning member, in another embodiment of the method of producing a cleaning member and the system which produces a cleaning member according to the present disclosure, the order of stacking the substrate sheet, the holding sheet and the fibrous member is changed to dispose a receiving part between any adjacent fibrous members. This allows the both surfaces of the cleaning member to be used for cleaning.

In another embodiment of the method of producing a cleaning member and the system which produces a cleaning member according to the present disclosure, in order to facilitate insertion of the insert part into the receiving part, the substrate sheet and the holding sheet are preferably configured to have a larger longitudinal dimension compared with the fibrous members. In still another embodiment of the method of producing a cleaning member and the system which produces a cleaning member according to the present disclosure, the sheet with slits is not stacked. In still another embodiment, the sheet with slits 7 is stacked onto the both surfaces of the cleaning member 1.

The present disclosure relates to the following J1 to J14:

[J1]

A method of continuously producing an opened fiber bundle for a cleaning member, comprising the steps of:

($a_1$) providing (i) first nip rolls, (ii) second nip rolls, which are disposed downstream from the first nip rolls and have a faster peripheral velocity compared with the first nip rolls, (iii) third nip rolls, which are disposed downstream from the second nip rolls and have a slower peripheral velocity compared with the second nip rolls, and (iv) an air feeder which is disposed downstream from the second nip rolls;

($a_2$) conveying the fiber bundle using the first nip rolls and the second nip rolls to apply a tensile force to the fiber bundle;

($a_3$) conveying the fiber bundle using the second nip rolls and the third nip rolls to relax the fiber bundle, thereby forming a belt-shaped fiber bundle; and ($a_4$) blowing air from the air feeder in a direction intersecting with orthogonal to the conveying direction of the belt-shaped fiber bundle.

[J2]

The method according to J1, wherein an opening facilitator which comprises an edge extending orthogonal to the machine direction, an upstream portion adjacently located upstream from the edge, and a downstream portion adjacently located downstream from the edge is disposed between the first nip rolls and the second nip rolls, and the fiber bundle is conveyed with the fiber bundle pushed onto the upstream portion and the edge of the opening facilitator.

[J3]

The method according to J2, wherein after the fiber bundle runs through the edge, the fiber bundle is conveyed along the downstream portion of the opening facilitator.

[J4]

The method according to J2 or J3, wherein the opening facilitator is static.

[J5]

The method according to any one of J1 to J4, wherein a widening member which widens the belt-shaped fiber bundle in the width direction, is disposed downstream from the second nip rolls, and the belt-shaped fiber bundle is contacted with the widening member.

[J6]

The method according to J5, wherein the widening member comprises a curved portion which is downwardly curved toward the thickness direction of the belt-shaped fiber bundle, and the belt-shaped fiber bundle is conveyed while contacting with the curved portion.

[J7]

A method of producing a cleaning member, comprising the steps of:

(A) continuously producing an opened fiber bundle using the method according to any one of J1 to J6;

(B) stacking the opened fiber bundle with one or more other materials to form a multilayer web and fixing the respective materials of the multilayer web to each other; and (C) cutting the fixed multilayer web into individual cleaning members.

[J8]

An apparatus which opens a fiber bundle for a cleaning member, comprising:

first nip rolls second nip rolls, which are disposed downstream from the first nip rolls, have a faster peripheral velocity compared with the first nip rolls, and, together with the first nip rolls, convey the fiber bundle to apply a tensile force to the fiber bundle, third nip rolls, which are disposed downstream from the second nip rolls, have a slower peripheral velocity compared with the second nip rolls, and, together with the second nip rolls, convey the fiber bundle to relax the fiber bundle, thereby forming a belt-shaped fiber bundle, and an air feeder which is disposed downstream from the second nip rolls and blows air in a direction intersecting with the conveying direction of the belt-shaped fiber bundle.

[J9]

The apparatus according to J8, the apparatus further comprising an opening facilitator which comprises an edge extending orthogonal to the machine direction, an upstream portion adjacently located upstream from the edge, and a downstream portion adjacently located downstream from the edge and is disposed between the first nip rolls and the second nip rolls so that the fiber bundle is conveyed with the fiber bundle pushed onto the upstream portion and the edge.

[J10]

The apparatus according to J9, wherein the opening facilitator is disposed so that the fiber bundle is conveyed along the downstream portion.

[J11]

The apparatus according to J9 or J10, wherein the opening facilitator is static.

[J12]

The apparatus according to any one of J9 to J11, the apparatus comprising, downstream from the second nip rolls, a widening member which widens the belt-shaped fiber bundle in the width direction to contact with the belt-shaped fiber bundle.

[J13]

The apparatus according to J12, wherein the widening member comprises a curved portion which is downwardly curved toward the thickness direction of the belt-shaped fiber bundle to convey the belt-shaped fiber bundle while contacting with the curved portion.

[J14]

A system which produces a cleaning member, comprising:
the apparatus which opens a fiber bundle according to any one of J8 to J13;
one or more apparatuses which stack the opened fiber bundle with one or more other materials to form a multilayer web and fix the respective materials of the multilayer web to each other; and
one or more apparatuses which cut the fixed multilayer web into individual cleaning members.

The present application claims the benefit of the following patent applications, and the entire disclosure of which is incorporated herein by reference:

(1) JP Patent Application No. 2012-289181 filed on Dec. 29, 2012, and US patent application claiming priority thereof, (2) JP Patent Application No. 2012-289182 filed on Dec. 29, 2012, (3) JP Patent Application No. 2012-289174 filed on Dec. 29, 2012, and US patent application claiming priority thereof, (4) JP Patent Application No. 2012-289189 filed on Dec. 29, 2012, and US patent application claiming priority thereof, (5) JP Patent Application No. 2012-289175 filed on Dec. 29, 2012, and US patent application claiming priority thereof, (6) JP Patent Application No. 2012-289188 filed on Dec. 29, 2012, and US patent application claiming priority thereof, (7) JP Patent Application No. 2012-289179 filed on Dec. 29, 2012, and US patent application claiming priority thereof, (8) JP Patent Application No. 2012-289177 filed on Dec. 29, 2012, and US patent application claiming priority thereof, (9) JP Patent Application No. 2012-289184 filed on Dec. 29, 2012, and US patent application claiming priority thereof,

(10) JP Patent Application No. 2012-289178 filed on Dec. 29, 2012, and US patent application claiming priority thereof,

(11) JP Patent Application No. 2012-289176 filed on Dec. 29, 2012, and US patent application claiming priority thereof,

(12) JP Patent Application No. 2013-002855 filed on Jan. 10, 2013, and US patent application claiming priority thereof, as well as

(13) JP Patent Application No. 2013-002857 filed on Jan. 10, 2013, and US patent application claiming priority thereof.

REFERENCE SIGNS LIST 1 cleaning member
2 brush part
3 first fibrous member
4 second fibrous member
5 third fibrous member
6 fourth fibrous member
7 sheet with slits
8 first melt bonded part
11 second melt bonded part
12 substrate sheet
13 holding sheet
14 receiving part
15 handle
16 insert part
16a projection
17 holder
18 melt bonded line
20 reed-shaped part
20a slit
100 system which produces cleaning member
101 apparatus which opens fiber bundle
102 first nip rolls
104 tension roll
106 second nip rolls
108 air feeder
110 oil applicator
112 dust adsorbent oil bath
114 third nip rolls
115 opening facilitator
116 edge
117 upstream portion
118 downstream portion
119a first surface
119b: second surface
120, 122, and 150 nonwoven fabric roll
121, 123, and 151 belt-shaped nonwoven fabric
124, 126, and 152 dancer roller
128, 132, 136, 138, 140, and 156 merging point
130 gather cutter
134 second melt bonding apparatus
154 gather roll
158 first melt bonding apparatus
160 cutter unit
201 widening member
202 curved portion

The invention claimed is:

1. A method of continuously producing an opened fiber bundle for a cleaning member, the method comprising the steps of:
($a_1$) providing
(i) first nip rolls rotating at a constant peripheral velocity,
(ii) second nip rolls, which are disposed downstream in a conveying direction from the first nip rolls and have a faster peripheral velocity compared with the first nip rolls,
(iii) third nip rolls, which are disposed downstream in the conveying direction from the second nip rolls and have a slower peripheral velocity compared with the second nip rolls,
(iv) an air feeder which is disposed between the second nip rolls and the third nip rolls in the conveying direction, and
(v) a widening member disposed downstream in the conveying direction from the second nip rolls, wherein the widening member widens the belt-shaped fiber bundle in a width direction thereof while the belt-shaped fiber bundle is in contact with the widening member, and the widening member comprises a curved portion downwardly curved in a thickness direction of the belt-shaped fiber bundle;
($a_2$) conveying a fiber bundle in the conveying direction using the first nip rolls and the second nip rolls to apply a tensile force to the fiber bundle between the first nip rolls and the second nip rolls so that the fiber bundle is extended;

($a_3$) conveying the fiber bundle further downstream in the conveying direction using the second nip rolls and the third nip rolls, which have the slower peripheral velocity compared with the second nip rolls, to relax the fiber bundle by relieving the tensile force and to widen the fiber bundle, thereby forming a belt-shaped fiber bundle; and ($a_4$) blowing air from the air feeder in a direction intersecting with the conveying direction of the belt-shaped fiber bundle.

2. A method of continuously producing an opened fiber bundle for a cleaning member, the method comprising the steps of:

($a_1$) providing
  (i) first nip rolls rotating at a constant peripheral velocity,
  (ii) second nip rolls, which are disposed downstream in a conveying direction from the first nip rolls and have a faster peripheral velocity compared with the first nip rolls,
  (iii) third nip rolls, which are disposed downstream in the conveying direction from the second nip rolls and have a slower peripheral velocity compared with the second nip rolls, and
  (iv) an air feeder which is disposed downstream in the conveying direction from the second nip rolls, between the second nip rolls and the third nip rolls;

($a_2$) conveying a fiber bundle in the conveying direction using the first nip rolls and the second nip rolls to apply a tensile force to the fiber bundle between the first nip rolls and the second nip rolls so that the fiber bundle is extended;

($a_3$) conveying the fiber bundle further downstream in the conveying direction using the second nip rolls and the third nip rolls, which have the slower peripheral velocity compared with the second nip rolls, to relax the fiber bundle by relieving the tensile force and to widen the fiber bundle, thereby forming a belt-shaped fiber bundle; and ($a_4$) blowing air from the air feeder in a direction intersecting with the conveying direction of the belt-shaped fiber bundle, wherein
said providing further includes providing an opening facilitator disposed between the first nip rolls and the second nip rolls,
said opening facilitator includes an edge extending orthogonal to the conveying direction, an upstream portion adjacently located upstream from the edge, and a downstream portion adjacently located downstream from the edge,
the fiber bundle is pushed onto the upstream portion and the edge of the opening facilitator while being conveyed in the step ($a_2$), and
the step ($a_2$) comprises
conveying the fiber bundle in a first direction along the upstream portion of the opening facilitator, and
then conveying the fiber bundle in a second direction along the downstream portion of the opening facilitator, the second direction different from the first direction.

3. The method according to claim 2, wherein after the fiber bundle runs through the edge, the fiber bundle is conveyed along the downstream portion of the opening facilitator.

4. The method according to claim 2, wherein the opening facilitator is static.

5. The method according to claim 1, wherein
the belt-shaped fiber bundle is conveyed and widened while contacting with the curved portion.

6. The method according to claim 2, wherein an angle between the first and second directions is in a range of 30° to 150°.

7. The method according to claim 2, wherein
fibers located at a first surface of the fiber bundle are in direct contact with the opening facilitator, and
fibers located at a second surface, opposite the first surface, of the fiber bundle travel, at the edge of the opening facilitator, over a longer distance than the fibers at the first surface of the fiber bundle.

8. The method according to claim 2, wherein the step ($a_2$) comprises
the conveying the fiber bundle in the second direction is such that the fiber bundle is conveyed along but spaced away from the downstream portion of the opening facilitator.

9. The method according to claim 1, wherein
the step ($a_1$) further comprises providing tension rolls between the first nip rolls and the second nip rolls in the conveying direction, and
the tension rolls gradually increase the tensile force applied to the fiber bundle.

* * * * *